United States Patent [19]
Clarke

[11] 3,721,407
[45] March 20, 1973

[54] AIRCRAFT CANOPY SEPARATION SYSTEM

[75] Inventor: James A. Clarke, Plainview, N.Y.

[73] Assignee: Fairchild Industries, Inc., Montgomery County, Md.

[22] Filed: Feb. 12, 1970

[21] Appl. No.: 10,861

[52] U.S. Cl. .................. 244/121, 49/141, 70/92, 244/122 AE
[51] Int. Cl. .................................. B64c 1/14
[58] Field of Search ..... 244/121, 122; 102/24; 52/98, 52/99; 49/141; 292/327, 92; 287/36 D; 70/92, 422; 285/2

[56] References Cited

UNITED STATES PATENTS

| | | | |
|---|---|---|---|
| 3,561,703 | 2/1971 | Stencel | 244/121 |
| 2,971,728 | 2/1961 | Martin | 244/122 AF |
| 3,371,605 | 3/1968 | Eckels | 102/24 HC |
| 3,542,319 | 11/1970 | Duncan | 244/122 AF |
| 2,374,898 | 5/1945 | Rossiter | 292/327 |

FOREIGN PATENTS OR APPLICATIONS

| | | | |
|---|---|---|---|
| 1,029,240 | 5/1966 | Great Britain | 102/49.5 |
| 698,226 | 10/1953 | Great Britain | 49/141 |

Primary Examiner—Milton Buchler
Assistant Examiner—Barry L. Kelmachter
Attorney—Michael W. York

[57] ABSTRACT

An aircraft canopy separation system including a frangible member that can comprise tempered glass or a glass ceramic that is connected to the aircraft canopy at a location that will permit the opening or removal of the canopy after the frangible member has disintegrated as a result of being struck by a sharp instrument. The frangible member comprises a rod that is located within a hinge that is attached to the canopy. A sharp-pointed instrument is also provided for striking the frangible member that may be located on an aircraft ejection seat at a point where it will strike the frangible member as the ejection seat is being ejected from the cockpit of the aircraft.

10 Claims, 9 Drawing Figures

PATENTED MAR 20 1973 3,721,407
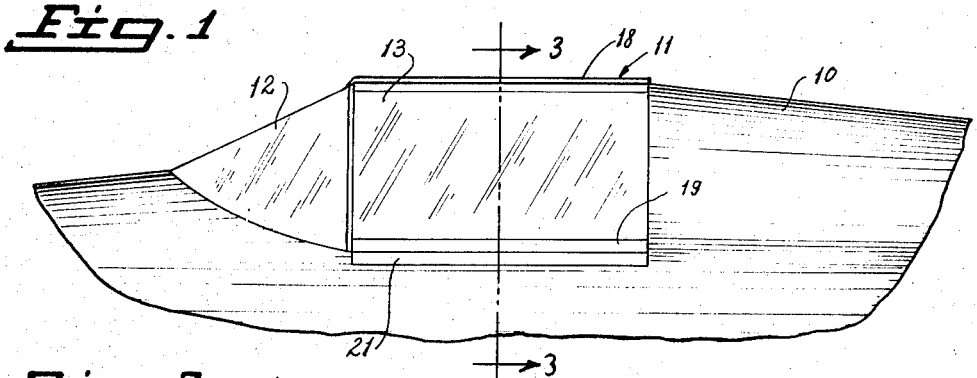
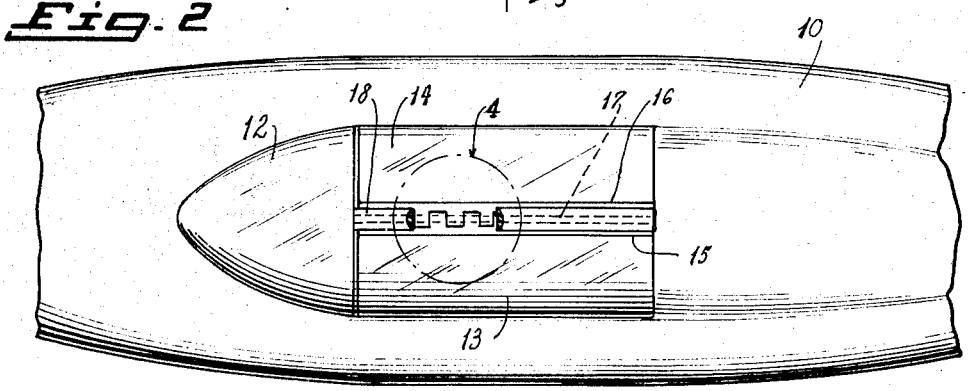
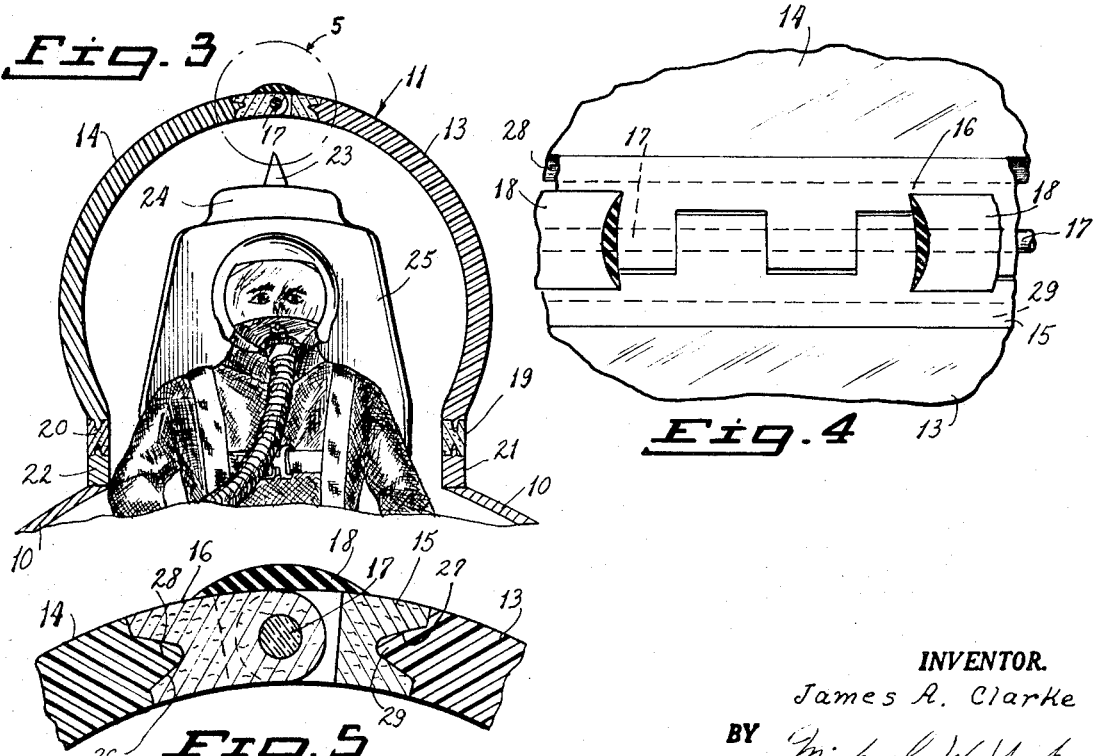
INVENTOR.
James R. Clarke
BY Michael W. York
Attorney

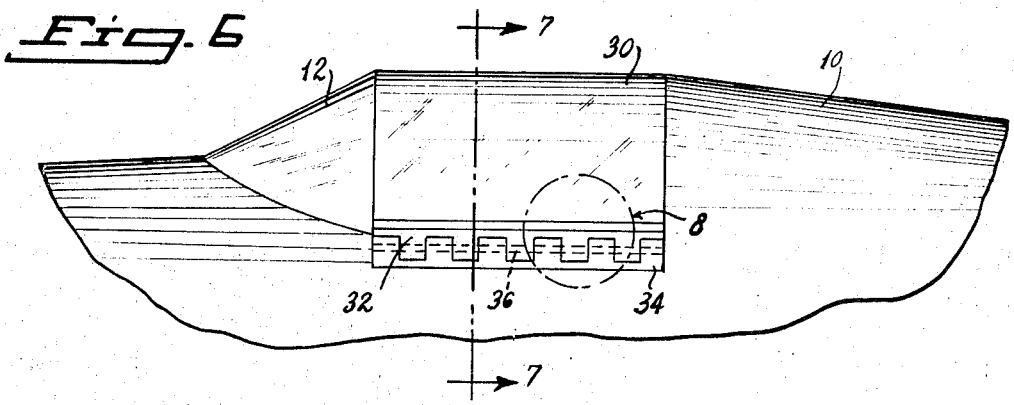
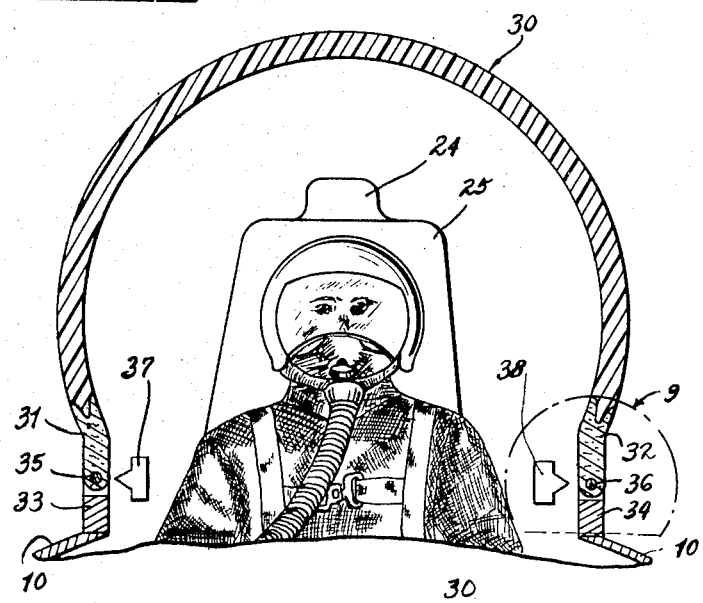
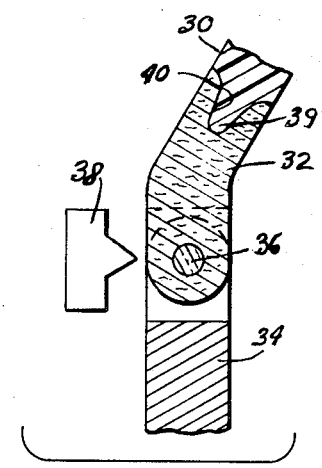
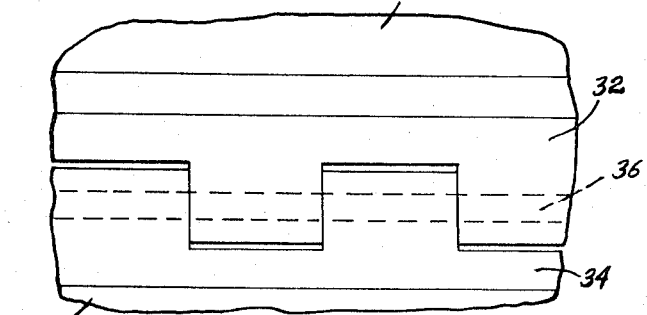

AIRCRAFT CANOPY SEPARATION SYSTEM

This invention relates to aircraft canopies and more particularly to an aircraft canopy separation system that utilizes a frangible member to permit the rapid opening of the canopy.

Many modern high speed aircraft require a system for rapidly ejecting an airman from the aircraft in the event the aircraft and the airman are endangered due to damage or malfunction of the aircraft. With modern high-speed aircraft it is essential that this ejection occur as rapidly as possible since any delay in departing from the aircraft may prevent the airman from safely exiting the aircraft.

Various systems have been developed to rapidly eject airmen from aircraft. One well-known system incorporates an explosive charge or other such device that projects the aircraft seat and the airman upward and out of the aircraft cockpit. With this type of system, it is usually necessary to provide an opening in the aircraft canopy through which the airman and the seat can be ejected or to provide a means for jettisoning the canopy. Unfortunately, the jettisoning of the canopy or removing or opening a portion of it to permit ejection from the aircraft consumes time and effort on the part of the airman and in some instances where the canopy or canopy mechanism is damaged, this may not be possible. In order to avoid these difficulties, systems have been designed that project or fire the airman in his aircraft seat through the canopy. This type of system permits the airman to eject from the aircraft with minimal effort even though the canopy cannot be opened. Although the type of system that fires the airman through the canopy has decided advantages, the airman is subject to possible injury as he passes through the canopy since present canopies can present serious hazards to the ejecting airman. Present canopies are designed primarily to protect the airman during normal flight and thus the impact of the ejecting seat as it strikes the canopy can injure the airman. In addition, the fragments or remaining portions of the canopy can strike and injure the airman as he passes through the canopy.

Many canopy systems do not permit the airman to be readily removed from the cockpit by a person outside the aircraft if the canopy opening system is damaged as a result of the crash of the aircraft, nor do they permit the airman to readily remove or open the canopy without ejecting from the cockpit when the canopy opening system is damaged.

The aircraft canopy separation system of this invention overcomes these disadvantages and permits the airman to safely and rapidly eject himself from the aircraft cockpit and permits the removal of the airman from outside the aircraft in the event of damage to the canopy opening system. In addition, this canopy separation system permits the airman to get out of the cockpit without ejecting in the event the normal canopy opening system is inoperative.

It is therefore an object of the present invention to provide an aircraft canopy separation system that permits the airman to eject from the cockpit without removing or jettisoning the canopy prior to ejection.

It is also an object of this invention to provide an aircraft canopy separation system that permits the airman to rapidly eject himself from the cockpit.

A further object of this invention is to provide an aircraft canopy separation system that permits the airman to safely eject from the cockpit.

A further object of this invention is to provide an aircraft canopy separation system that permits the airman to open the canopy without ejecting from the cockpit in the event that the normal canopy opening system is inoperative.

A further object of this invention is to provide an aircraft canopy separation system that permits the removal of the airman from the cockpit by a person outside the aircraft in the event the normal canopy opening system is damaged.

The present invention provides an aircraft canopy separation system that includes a frangible member connected to the aircraft canopy at a location that will permit the opening or removal of the canopy when the frangible member disintegrates after being struck by a sharp instrument. A sharp-pointed instrument is also provided for striking the frangible member. This sharp-pointed instrument can be connected to the aircraft ejection seat at a point where it will strike the frangible member as the aircraft ejection seat is being ejected from the cockpit of the aircraft.

In order that the invention may be more clearly set forth and better understood, reference is made to the drawings in which:

FIG. 1 is a partial side elevational view of an aircraft and aircraft canopy embodying the features of the present invention;

FIG. 2 is a top plan view of the structure illustrated in FIG. 1;

FIG. 3 is an enlarged sectional view of the structure illustrated in FIG. 1 taken along the line 3—3 thereof;

FIG. 4 is an enlarged broken view of the structure illustrated in FIG. 2 taken within the circle 4 thereof;

FIG. 5 is an enlarged broken sectional view of the structure illustrated in FIG. 3 taken within the circle 5 thereof;

FIG. 6 is a partial side elevational view of an aircraft and aircraft canopy illustrating another embodiment of the present invention;

FIG. 7 is an enlarged sectional view of the structure illustrated in FIG. 6 taken along the line 7-7 thereof;

FIG. 8 is an enlarged broken view of the structure illustrated in FIG. 6 taken within the circle 8 thereof; and FIG. 9 is an enlarged broken sectional view of the structure illustrated in FIG. 7 taken within the circle 9 thereof.

Referring first to FIGS. 1 through 5 there is shown the cockpit region of an aircraft fuselage 10 and a canopy 11 that extends aft of a fixed windshield 12 and covers the cockpit. The canopy 11 comprises a left canopy section 13 and a right canopy section 14 that are joined at their upper edges by connecting hinges 15 and 16 that are connected to and extend completely along the upper edges of the two canopy sections. The canopy sections 13 and 14 are composed of a transparent plastic such as an acrylic plastic. A frangible member comprising an elongated shaped round rod 17 is disposed between and adjacent to the upper edges of the left and right canopy sections 13 and 14 and joins the connecting hinges 15 and 16 that are connected to the canopy and extends through their entire lengths. A rubber protective covering 18 is attached to the outside of a connecting hinge 15 or 16 above the frangible rod 17 in order to protect the rod. A flexible side connecting strip 19 is attached to and extends along the entire lower edge of the left canopy section 13. A corresponding flexible side connecting strip 20 is also attached to the lower edge of the right canopy section 14 and extends along its entire lower edge. The lower edges of the side connecting strips 19 and 20 are connected respectively to side support rails 21 and 22 that are attached to the fuselage 10. The flexible nature of the connecting strips 19 and 20 permit the left and right canopy sections 13 and 14 to pivot outward when they are not joined at their upper edges by the connecting hinges 15 and 16 and the frangible rod 17. The side connecting strips 19 and 20 may be made from Nylon or some other suitable flexible material.

As illustrated in FIG. 3, a sharp-pointed instrument 23 is connected to a projection 24 on an aircraft ejection seat 25 that is located in the cockpit within the canopy 11. This pointed instrument 23 is designed to strike the frangible rod 17 as the seat 25 is being projected out of the cockpit during ejection. When the pointed instrument 23 strikes the frangible rod 17, it causes the entire rod to disintegrate which in turn permits separation of the connecting hinges 15 and 16 that connect the right and left canopy sections 13 and 14 at their upper edges and this permits the canopy to be opened. As the aircraft seat continues to move up during ejection, after the rod 17 has disintegrated, the top projection 24 will strike the right and left canopy sections 13 and 14 and this will cause them to open and pivot outward around the flexible connecting strips 19 and 20. The aircraft seat 25 and the airman will then pass through the opening that results when the right and left canopy sections 13 and 14 pivot outward.

As illustrated in FIGS. 4 and 5, the connecting hinges 15 and 16 have grooves 26 and 27 on their edges that are designed to accept ridges 28 and 29, that are bonded or riveted to the hinges, located respectively on the upper edges of the right and left canopy sections 14 and 13. The frangible rod 17 is centrally located within, and is connected to the canopy by the connecting hinges 15 and 16 and it joins the hinges together. The frangible rod 17 should be of sufficient diameter to retain the structural integrity of the canopy 11 when subjected to the normal design air loads and temperature. The rubber protective cover 18 is lightly bonded to a connecting hinge 15 or 16.

In FIGS. 6 through 9 an alternative embodiment of the invention is shown that employs a single piece canopy 30. The canopy 30 is attached at its lower edges to right and left connecting hinges 31 and 32 that are connected respectively to right and left side support rails 33 and 34 that are attached to the fuselage 10. Frangible members comprising elongated shaped round rods 35 and 36 are disposed between the two lower edges of the canopy 30 and the fuselage 10 and join the connecting hinges 31 and 32 to the side support rails 33 and 34 and extend throughout their entire lengths. The frangible rods 35 and 36 are surrounded and connected to the canopy by the respective hinges 31 and 32. As illustrated in FIG. 7, sharp-pointed instruments 37 and 38 are provided in the cockpit for striking the respective frangible rods 35 and 36. These sharp-pointed instruments 37 and 38 are activated by the upward movement of the ejection seat 25 at the beginning of ejection and upon activation they move outward to strike the frangible rods 35 and 36 and cause them to disintegrate. After the frangible rods 35 and 36 have disintegrated, the canopy 30 has essentially been separated from the fuselage 10 and the top projection 24 of the seat as the seat 25 moves upward pushes the canopy upward and removes the canopy from the fuselage so that safe ejection is possible.

The details of the canopy connection of the alternative embodiment are shown in FIGS. 8 and 9. The canopy 30 is secured to the left connecting hinge 32 by means of a ridge 39 that is held within an upper groove 40 in the left connecting hinge by bonding or riveting. The left support rail 34 closes out the bottom of the canopy and acts as part of the main canopy support framing. The frangible rod 36 is located within the connecting hinge 32 adjacent to the lower left edge of the canopy 30; and it connects the hinge to the support rail 34. The right connecting hinge 31 is secured to the canopy 30 in the same manner as the left connecting hinge and the frangible rod 35 that is similar to rod 36 is located adjacent to the lower right edge of the canopy 30 and it connects the right connecting hinge 31 to the right support rail 33 that is connected to the fuselage 10. When the frangible rods 35 and 36 disintegrate after being struck by the sharp instruments 37 and 38, the right and left connecting hinges 31 and 32 are no longer connected to the respective right and left support rails 33 and 34 and thus the canopy 30 is free to move in an upward direction so that the canopy can be opened or removed.

The frangible rods 17, 35, and 36 of this invention also permit the canopy to be opened without using the ejection seat. In the event the airman needs to open the canopy manually without ejecting, he can strike the frangible rod 17, 35 or 36 with some suitable sharp-pointed instrument and this will cause the frangible rod to disintegrate and allow him to separate the canopy sections 13 and 14 in the embodiment shown in FIGS. 1 through 5 or to remove the canopy 30 in the embodiment shown in FIGS. 5 through 9. The airman can also be removed by someone outside the aircraft who uses some suitable sharp instrument to strike the frangible rod 17, 35 or 36 and cause it to disintegrate.

The type of frangible materials that can be used for the frangible rods 17, 35 and 36 include various types of tempered glass and special compositions of glass ceramics. It is well known that tempered glass has the characteristic of great tensile stress in the interior of the material which is balanced by compressive forces near the surface. As a result of this, the entire tempered glass member disintegrates into a pulverized material if the compressive layer is penetrated by a blow from a sharp instrument. Certain glass ceramics also have these properties an can be used for the frangible rods 17, 35 and 36. The glass ceramics known by the trademark Pyroceramic of the Corning Glass Works have these qualities and also can be used at higher temperatures than tempered glass.

Although the invention has been described in considerable detail with reference to certain preferred embodiments, it will be understood that variations and modifications may be made within the spirit and scope of the invention as defined in the appended claims.

What is Claimed is:

1. In an aircraft having a cockpit, a canopy covering at least a portion of said cockpit and an elongated frangible rod member comprising a material having tensile stress in its interior which is balanced by compressive forces near its surface that disintegrates if its compressive layer is penetrated, said elongated frangible rod member being connected to said canopy at a location adjacent to an edge of at least a portion of said canopy that will assist in permitting the opening or removal of said canopy when said elongated frangible rod member disintegrates.

2. The apparatus as recited in claim 1 wherein said canopy comprises two sections and said frangible rod member is located adjacent to an edge of each of said two sections.

3. The apparatus as recited in claim 2 further comprising means connected to at least one of said sections for permitting pivotal movement of said section when said frangible rod member disintegrates.

4. The apparatus as recited in claim 1 wherein said frangible rod member is located adjacent to a lower edge of said canopy.

5. The apparatus as recited in claim 4 including a second frangible rod member located adjacent to another lower edge of said canopy.

6. The apparatus as recited in claim 1 including at least one instrument located within said cockpit for striking said frangible rod member.

7. The apparatus as recited in claim 6 including an aircraft ejection seat in said cockpit and wherein said instrument is connected to said ejection seat at a point where it will strike said frangible rod member as said ejection seat is being ejected from said cockpit.

8. The apparatus as recited in claim 7 including at least one connecting member surrounding at least a portion of said frangible rod member and connecting said frangible rod member to at least a portion of said canopy.

9. The apparatus as recited in claim 1 wherein said frangible rod member comprises tempered glass.

10. The apparatus as recited in claim 1 wherein said frangible rod member comprises a glass ceramic.

* * * * *